May 17, 1949.  C. E. CARTER  2,470,287
HAIR CLIPPER
Filed June 12, 1945

INVENTOR.
Clarence E. Carter
BY Henry B. Lester
ATTORNEY

Patented May 17, 1949

2,470,287

UNITED STATES PATENT OFFICE 2,470,287

HAIR CLIPPER

Clarence E. Carter, San Francisco, Calif.

Application June 12, 1945, Serial No. 598,941

1 Claim. (Cl. 30—195)

An object of my invention, which relates to adjustable hair clippers is to be able to cut all the hair, and by an adjustment to be able with the same instrument to cut only part of the hair and thereby to thin the hair.

In the accompanying drawings similar numbers apply to similar parts.

Figure 1:
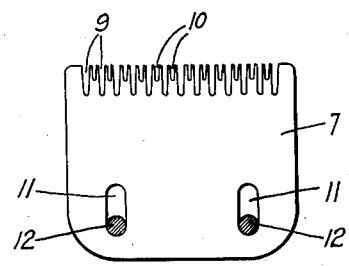
Fig. 1 is a plan view of the lower cutting plate.
Figure 2:
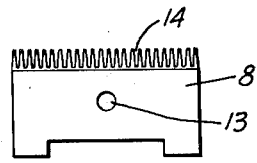
Fig. 2 is a plan view of the upper cutting plate.
Figure 3:
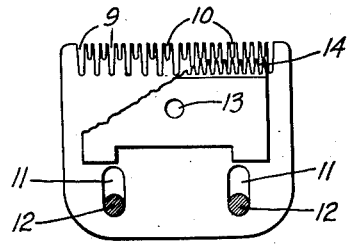
Fig. 3 is a plan view partly broken of the two plates in position to cut only in the deep indentations.
Figure 4:
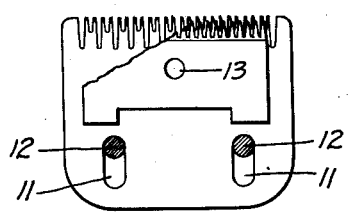
Fig. 4 is a plan view partly broken of both cutting plates in position to cut with all indentations.
Figure 5:
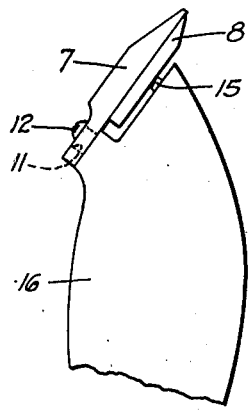
Fig. 5 is a side view of machine with plates attached to the vibrator handle and with lower plate in position shown in Fig. 4.
Figure 6:
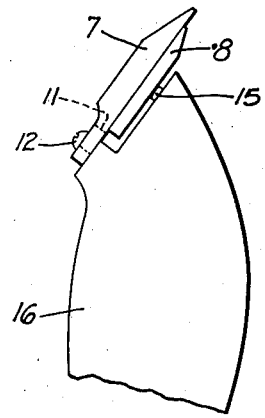
Fig. 6 is a side view with plates attached to vibrator handle and with cutting plates shown in position as in Fig. 3.

The cutting plate 7, is equipped with deep indentations 9 and shallow indentations 10, alternating with the deep indentions 9. This plate 7 may be moved forwards or backwards by unloosening set-screws 12, 12 and slot 11, 11, and the screws 12, 12 secure plate 7 to handle 16. The cutting plate 8 vibrates or oscillates over lower plate 7, by means of a lever working in hole 13, and when the plate 7 is in the position shown by Figures 3 and 6 the small indentations 10, 10 in plate 7 will act as a comb to keep half of the hair away from the cutting plate 8, and thereby the hair will not all be cut, but will be thinned, also when it is desired to cut all the hair without thinning it the lower cutting plate 7 is moved into the position shown in Figures 4 and 5.

I realize that there have been thinning plates before my invention somewhat similar to my device for combing part of the hair away from the shears, but the method of moving the plate 7 so that the same machine can be readily adjusted to thin the hair or cut it all is new and useful.

I do not confine my invention to the method shown of moving the plate 7 by means of a slot and screws, because the plate may be moved by a lever or other means.

Having thus explained my invention, I claim:

A hair clipper, including in combination, a lower blade having alternately long and short notches, providing teeth each having a long and short cutting edge, a movable upper blade having cutting teeth with edges which are all of the same length, means to oscillate the said upper blade transversely across the lower blade, and means to move the lower blade forwards or backwards, so that when the lower blade is in a backward position the teeth of both blades will all be cutting teeth, and means to secure the lower blade in a backward position, and means to secure the lower blade in a forward position so that only the long cutting edges of the lower blade will come in contact with the cutting teeth of the upper blade, and the short cutting edges of the lower blade will not be in contact with the teeth of the upper blade, and thereby the hair will be thinned and only a part of it will be cut.

CLARENCE E. CARTER.

REFERENCES CITED

The following references are of record in the file of this patent:

UNITED STATES PATENTS

| Number | Name | Date |
|---|---|---|
| 2,118,850 | Marcell | May 31, 1938 |